I. M. WILLIAMS.
Butter Worker.
No. 12,366.                  Patented Feb. 6, 1855.
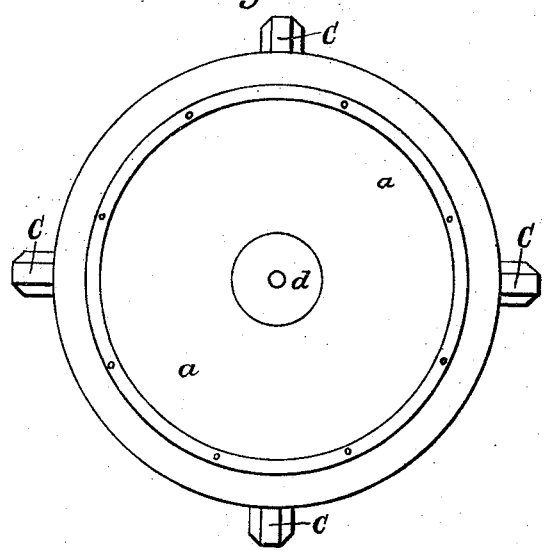
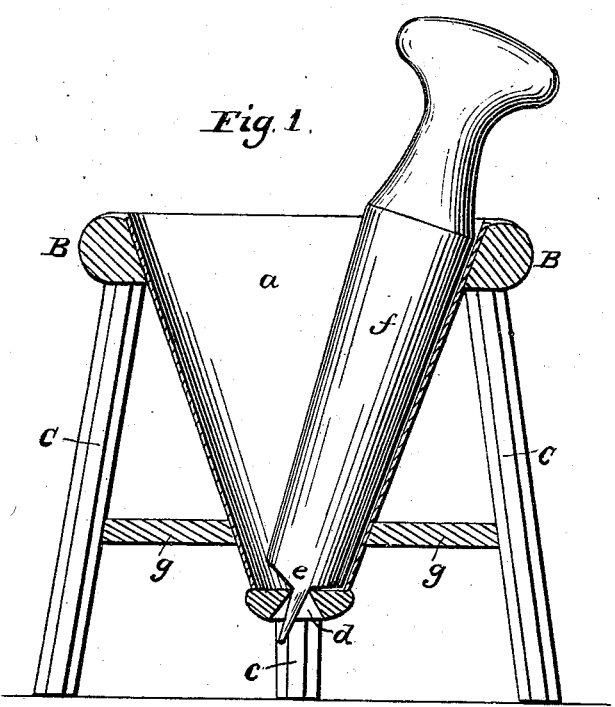

UNITED STATES PATENT OFFICE.

I. M. WILLIAMS, OF BLANCHESTER, OHIO.

BUTTER-WORKER.

Specification of Letters Patent No. 12,366, dated February 6, 1855.

*To all whom it may concern:*

Be it known that I, I. M. WILLIAMS, of Blanchester, in the county of Clinton and the State of Ohio, have invented a new and Improved Butter-Dresser; and I do hereby declare that the following is a full and exact description thereof, reference being had to the accompanying drawing and to the letters and figures of reference marked thereon.

Th nature of my improvement consists in constructing a round vessel of tin or wood tapering from top to bottom, say top four times the diameter of bottom as shown in Figure 1, marked A, which I shall term the bowl. I then fit a bottom on the small end of the bowl in which I make a small hole through the center as shown by Figs. 1, and 2 and marked d, this hole I bush with bone to prevent it from wearing. I fasten a rim B, Fig. 1, around the top of the bowl to which rim I fasten four legs marked C, at a proper distance from the top or rim I fit in a brace marked g, Fig. 1, which connects the legs together, the brace having a hole through it receives the bottom or small end of the butter bowl, the bowl being thus fast in the frame and set upon its feet as shown in Fig. 2, gives it the correct position for use, I then make what I shall term the working stick f, Fig. 1, which is made round, the length of the depth of the bowl, and to extend above the top of the bowl in any shape for a convenient hand hold, the lower end of the stick made in size nearly to fill the space in the bottom of the bowl, and to increase in size a little, to the top of the bowl, at the lower end of the stick and in the center I put in a bone pin marked e, Fig. 1, made to nearly fill the hole in the bottom of the bowl, and made to taper from the end of the working stick, and extend a little below the bottom. The lower end of working stick is beveled off each way from the center causing the bottom of the stick to set flat on the bottom of the bowl, in all of its angling positions, and the lower end of the hole through the bottom being flared out gives sufficient room for the pin to play around, and sufficiently stop the hole and prevent butter from passing through, in all the motions of the working stick around the circle of the bowl, this machine so made and constructed is calculated with great ease and facility to separate the butter milk entirely from fresh churned butter, without using water on it, it is very simple in its operation, to dress a batch of butter right from the churn, take the butter dresser, place in the working stick, put in the butter, lay your hand on top of the working stick, roll it around with the circle of the bowl, backward or forward, across or otherwise, through the butter, which will cause all the butter milk, or water that may be used, to sink directly to the bottom of the bowl and escape through the hole, while the butter is pushed from the hole all the while by the action of the working stick upon the bottom of the bowl and is retained in the bowl perfectly clear of all butter milk, or water, as it is a fact admitted by all that butter dressed without using water on it, is much better flavored, and will keep sweet much longer, in which case this machine is particularly adapted, that is, to dress butter, and work it completely clear of butter milk or whey, without the use of water, and in a shorter time than the same quantity can be dressed in the old way by flat bowl ladle and water, this machine is also well calculated to wash and dress butter by using water on it if preferred there may be a constant stream of water poured on the butter while using the working stick, the water works through the butter and passes off through the hole.

What I claim as my invention and desire to secure by Letters Patent, is—

A hollow cone in combination with a conical roller, working on its apex, constructed in the manner and for the purpose substantially as described.

I. M. WILLIAMS.

Witnesses:
 JOHN SIMONTON,
 B. F. ZELL.